March 16, 1965 O. W. SEPP, JR 3,173,636
PARACHUTE
Filed Dec. 5, 1962 2 Sheets-Sheet 1

INVENTOR.
OSCAR W. SEPP, JR.
BY
*Burgess, Ryan & Hicks*
ATTORNEYS

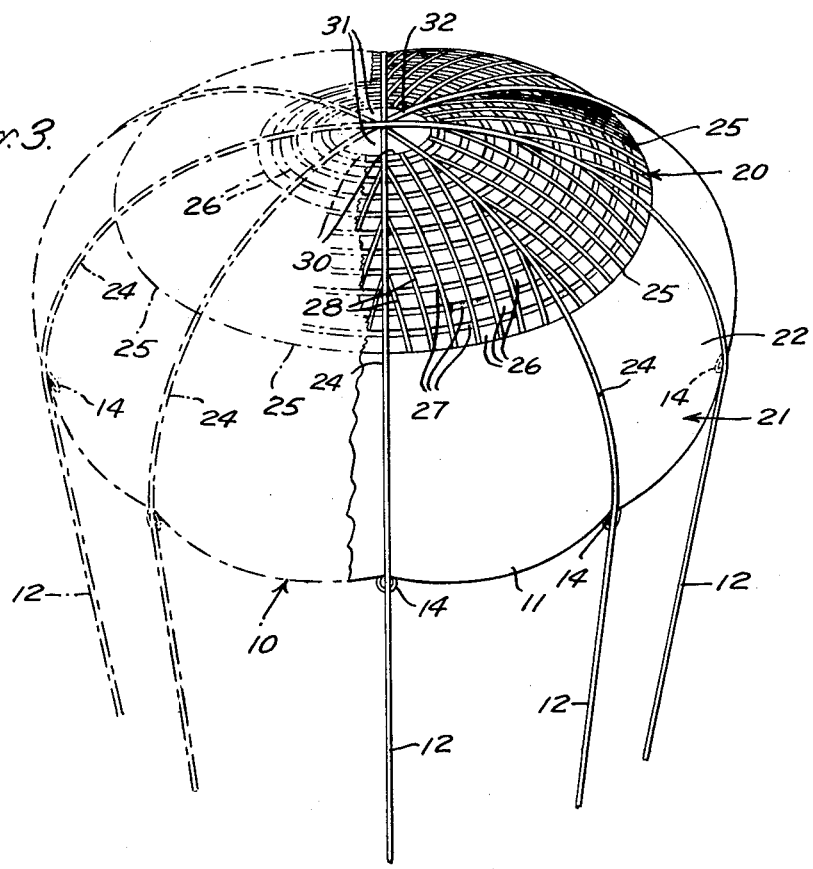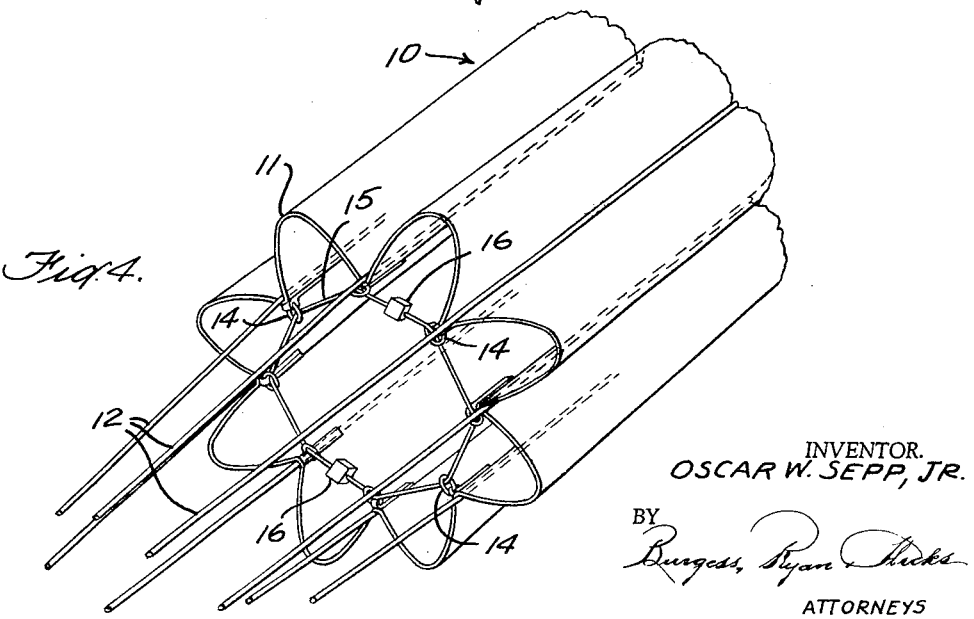

United States Patent Office 3,173,636
Patented Mar. 16, 1965

3,173,636
PARACHUTE
Oscar W. Sepp, Jr., Merrick, N.Y., assignor to M. Steinthal & Co., Inc., New York, N.Y., a corporation of New York
Filed Dec. 5, 1962, Ser. No. 242,405
2 Claims. (Cl. 244—145)

The present invention relates to high speed parachutes.

In certain types of high speed parachutes, there is provided a reefing line, which passes through a series of reefing rings on the skirt of the parachute canopy to limit the expansion of the parachute upon deployment into partially open position, and which is later severed or released either automatically by a timer or mechanically at the control of the pilot, to permit the parachute to open fully. Because of the high forces encountered during initial deployment and deceleration of the high speed parachute, ribbon or ringslot type of parachutes have been currently used. In such cases, the entire parachute canopy is so constructed with slots or openings to relieve the excessive dynamic pressure, and consequently is heavy, bulky and costly to manufacture. Moreover, such a canopy has a comparatively low drag coefficient.

Where a two stage parachute is employed in which a small ribbon type parachute decelerates to a safe speed before the main parachute is deployed, the system is bulky and heavy and requires more time to function due to the multiple number of parachutes involved.

One object of the present invention is to provide a new and improved parachute canopy, which is designed to withstand the relatively high forces encountered during initial deployment and deceleration, which is lighter in weight, smaller in bulk, and less costly to manufacture than conventional ribbon or ringslot type of parachute canopies, and which when fully open affords higher drag than do such conventional parachutes.

A parachute assumes a "tear drop" shape during reefed condition of use, with the bulbous section in the upper head portion of the canopy. The pressure built up in the reefed inflated canopy is such that the major forces on the canopy are concentrated in the upper ⅓ to ½ portion of the canopy, which constitutes substantially the entire bulbous part of the canopy. The pressure distribution in the lower portion of the reefed inflated canopy is markedly less, due to the restriction at the mouth of the canopy and the balance of the dynamic pressures outside and inside the canopy. The outside and inside pressures on the lower portion of the reefed inflated parachute are substantially equal, while the inside pressures on the upper bulbous head portion of the canopy are greater than the outside pressures.

In accordance with the present invention, the lower portion of the canopy, subjected to the lower differential pressures, is made of lightweight continuous cloth, while the upper portion, subjected to the high differential pressures is made of heavier stronger material provided with slots, desirably by a ribbon or ringslot construction, to withstand the higher differential pressures. The construction described, utilizing the combination of continuous cloth and slot defining materials, produces a high speed parachute, which when reefed and deployed, will effectively withstand the high pressures developed, and which when disreefed and fully expanded, will have a higher drag coefficient than conventional ribbon or ringslot type parachutes.

Various other objects, features and advantages of the invention are apparent from the following description and from the accompanying drawings, in which:

FIG. 3 is a diagrammatic perspective of the parachute canopy of the present invention; and FIG. 4 is a diagrammatic perspective of the lower section of the reefed inflated parachute canopy of the present invention, showing the reefing line at the mouth of the canopy.

Figures 1, 2:
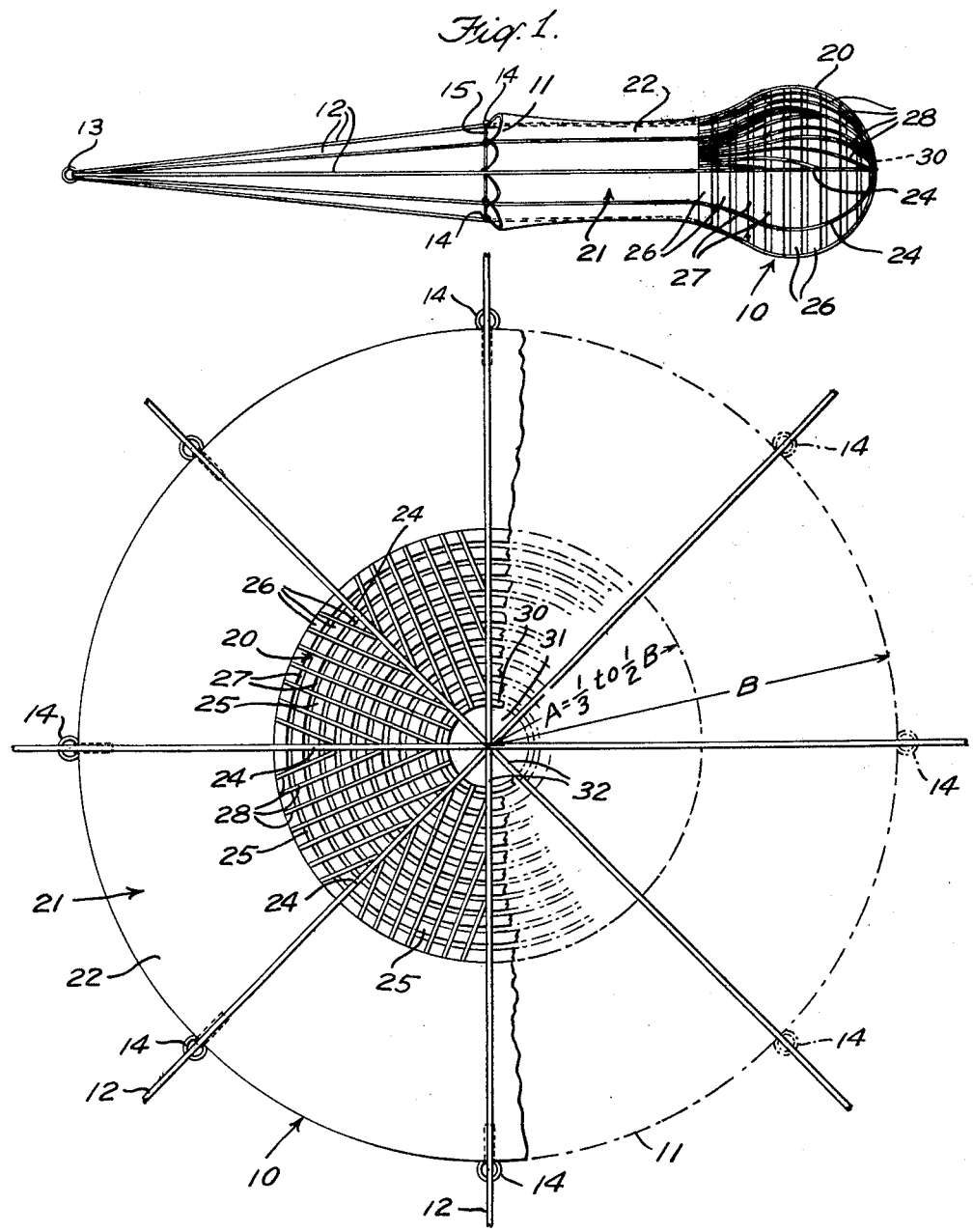
FIG. 1 shows somewhat diagrammatically a side elevation of a reefed inflated parachute embodying the present invention.
FIG. 2 is a diagrammatic plan view of the parachute canopy of the present invention spread out substantially flat.

Referring to the drawings, the parachute of the present invention comprises a canopy 10 with a skirt 11, a series of shroud or suspension lines 12 connected to the skirt at equally spaced intervals and leading to a shackle 13 or other suitable device for connection to a load, a series of reefing rings 14 of rigid material, such as a metal, connected to the skirt at equal intervals, a flexible annular reefing line 15 extending through the reefing rings before the parachute canopy is fully inflated, and one or more cutters 16 for the reefing line. This parachute construction, as described, is conventional and well-known.

The reefing line 15 when fully expanded, will have a diameter materially less than the diameter of the fully inflated parachute canopy 10. When initially deployed at high speed and while the parachute is being decelerated at high rate, the parachute canopy is maintained in partially inflated condition by the fully extended reefing line 15 at the mouth of the canopy, as shown in FIGS. 1 and 4. After an initial period of release of the parachute, the reefing line 15 is cut either automatically by a timer in the cutter 16 or mechanically at the option of the pilot, to permit the parachute to open fully into the condition shown in FIG. 3. The reefing line cutter 16, per se, forms no part of the present invention, and may be similar to that disclosed in the publication M.R. No. TSEPE-672-25D entitled Reefing Methods—Parachute, issued by the United States Air Force, Air Material Command and dated October 28, 1947.

When the parachute is deployed and while it is reefed, the canopy assumes the tear drop shape shown in FIG. 1 with an upper bulbous head section 20, and a lower generally cylindrical or slightly tapering neck section 21. The differential pressures on the lower section 21 of the canopy resulting from the inside and outside pressures are almost or substantially zero, while the differential pressures on the upper head section 20 due to the much greater internal pressures are substantial.

In accordance with the present invention, the upper section 20 of the canopy where the greater forces are developed is of strong heavy fabric material constructed to provide slots to withstand these forces. However, when the parachute canopy is disreefed and fully opened, the slots, if distributed over the entire area of the canopy, would reduce the drag coefficient of the parachute and the heavy material required to provide a perforated canopy, if employed for the entire canopy, would make the canopy bulky and weighty.

As a feature of the present invention, the slots in the canopy are confined in the areas of the upper head portion 20 where the heavy forces are encountered in the reefed inflated canopy, while the lower portion 21 of the canopy is of substantially imperforate cloth. It has been found in accordance with the present invention, that the slotted areas of the canopy should be confined to the upper ⅓ to ½ portion of the canopy.

In the specific form shown, the upper head portion 20 of the canopy 10 is of ribbon construction for a radial distance A which is equal to ⅓ to ½ the full radial distance B of the canopy, as shown in FIG. 2, and the remainder of the canopy in the lower portion 21 of the canopy constitutes a substantially imperforate cloth 22.

The ribbon section of the canopy 10 may be of conventional ribbon construction and is shown comprising generally a series of radial ribbons 24, equally spaced to define a plurality of sectorial panels 25, a plurality of horizontal ribbons 26 extending concentrically with respect to the center of a canopy and radially spaced to define openings 27 in the form of circumferential slots, a plurality of electrically spaced ribbons 28 shown extending parallel in each sectorial panel, the middle vertical ribbon in each panel extending radially of the canopy, a vent reinforcing band 30 around a central vent opening 31 in the canopy, and vent lines 32 extending across said vent opening, these ribbons and band being of strong construction, such as heavy woven nylon, and being secured together desirably by stitching. The suspension lines 12 may constitute extensions of the radial ribbons 24.

The cloth 22 in the lower section 21 of the canopy 10 is desirably of lightweight fabric, such as a lightweight woven nylon and is secured to the ribbon section 20 of the canopy, desirably by stitching.

By utilizing the combination of a substantially imperforate cloth section with a ribbon section in conjunction with a reefing device, there is produced a canopy, which is capable of effectively withstanding the forces due to high speed deployment and deceleration, which affords high drag when fully expanded, and which is of minimum weight and bulk. Also, since the ribbon construction is more expensive to manufacture than the cloth construction, it is seen that by limiting the ribbon construction to only part of the canopy, the cost of manufacture is materially reduced.

While the invention has been described with particular reference to a specific embodiment, it is to be understood that it is not to be limited thereto but is to be construed broadly and restricted solely by the scope of the appended claims.

What is claimed is:

1. A parachute comprising a parachute canopy having a series of openings distributed throughout the upper section thereof and having its lower section of substantially imperforate cloth, and releasable reefing means for holding the mouth of the parachute restricted after deployment, said parachute when reefed assuming a tear drop shape, said upper section having a radius of about 1/3 to 1/2 the radius of the canopy.

2. A parachute as described in claim 1, said upper section being made up of horizontal ribbons defining said openings in the form of slots.

References Cited in the file of this patent

UNITED STATES PATENTS

| | | |
|---|---|---|
| 2,384,127 | Nailor | Sept. 4, 1945 |
| 2,527,553 | Ingels | Oct. 31, 1950 |
| 2,726,057 | Knacke | Dec. 6, 1955 |
| 2,929,589 | Carter et al. | Oct. 26, 1956 |

FOREIGN PATENTS

| | | |
|---|---|---|
| 1,037,274 | Germany | Aug. 21, 1958 |